United States Patent [19]
Grow et al.

[11] Patent Number: 5,522,047
[45] Date of Patent: May 28, 1996

[54] GRACEFUL INSERTION OF A TREE INTO A RING NETWORK

[75] Inventors: Robert M. Grow; Ronald S. Perloff, both of Poway, Calif.

[73] Assignee: XLNT Designs, Inc., San Diego, Calif.

[21] Appl. No.: 167,338

[22] Filed: Dec. 15, 1993

[51] Int. Cl.⁶ ........................................... G06F 13/00
[52] U.S. Cl. ............... 395/200.20; 395/800; 364/DIG. 1; 364/292.94; 364/238.8
[58] Field of Search ................................. 395/200, 800, 395/500, 725, 200.21, 200.2, 200.10; 370/85.5, 85.4, 85.2–85.3

[56] References Cited

U.S. PATENT DOCUMENTS 5,182,747  1/1993  Frenzel, III et al. ............ 370/85.5
5,400,323  3/1995  Frenzel, III et al. ............ 370/56

*Primary Examiner*—Mehmet Geckil
*Attorney, Agent, or Firm*—Fish & Richardson

[57] ABSTRACT

Systems and methods for providing graceful insertion of a station or tree into a ring type network. According to one aspect of the invention, graceful insertion is achieved after coupling a tree to a tree link of a master port by switching the tree into a local ring, holding the local ring, and awaiting a token on the network ring. After a token is received on the network ring, the tree is switched from the local ring to the network ring. Monitoring ring status in hardware provides the responsiveness necessary which software graceful insertion typically cannot provide.

5 Claims, 10 Drawing Sheets

GRACEFUL INSERTION OF A TREE INTO A RING NETWORK

BACKGROUND OF THE INVENTION

1. Field of the Invention

The present invention relates generally to ring type network data transmission systems, and more particularly to a method and apparatus for gracefully inserting and removing stations from a ring type network.

2. Description of Related Art

Data transmission systems enable a number of stations to communicate with each other at high speeds over long distances. The combination of a data transmission system and a number of stations coupled to the data transmission system is commonly known as a network.

A station may be any one of a number of different types of devices, including computers and printers. Such stations typically include hardware and software for coupling the station to a data transmission system, thus forming a data input link from the data transmission system and a data output link to the data transmission system. The data input link allows the station to receive data from the data transmission system, and thus from other stations in the network. The data output link allows the station to send data to the data transmission system and thus to other stations in the network.

A "ring" is a common network topology. One common ring network is the token ring network according to The Institute of Electrical and Electronics Engineers (IEEE), Local Area Network Standard 802.5. Another common ring network standard is the American National Standard Institute (ANSI) Fiber Distributed Data Interface (FDDI). One advantage of rings over other topologies is that relatively simple protocols can be used to organize the transmission of data around the ring. Another advantage of rings is that as data arrives at each station, the data is simply passed from the data input link of a station to that station's data output link. The only routing decision that a station must make during normal use is whether the data is addressed to that station, in which case the data must be copied by the station.

It is well known to house at least part of the hardware and software for interfacing a station to a data transmission system in a hub device, also known as a concentrator. Typically a concentrator may interface several stations to a network.

Referring now to FIG. 1, a concentrator 100 is shown which connects several stations to a data transmission system, such as a ring type network. The concentrator 100 is coupled to a station through one or more port interface(s) 110. The concentrator 100 has a data input link 101, and a data output link 102. Such data input links from a ring are commonly known as "RingIns". Such data output links to a ring are commonly known as "RingOuts". These data links 101, 102 couple the concentrator 100 to the ring. Each port interface 110 also includes a RingIn 111 and a RingOut 112, which facilitate connecting stations in a ring configuration through the port interlaces 110. The concentrator 100 may also have a multiplexer 103 and internal data path 104 that allows a ring to be formed within the concentrator 100, effectively connecting RingIn 111 to RingOut 142. The concentrator 100 may also include a media access controller (MAC) 140 for the ring. The MAC 140 controls and mediates access for information exchange with other stations on the ring.

It is well known that since a concentrator 100 has both RingIn 101 and RingOut 102, a concentrator 100 may be inserted into a ring as if the concentrator 100 were a station. Because of this capability, the term "tree" is used to describe stations connected to a ring through a port interface 110.

Referring now to FIG. 2, each port interface 110 comprises a RingIn 111, a RingOut 112, a tree output link (TreeOut) 113, and a tree input link (TreeIn) 114. Master port logic 117 is coupled to the TreeIn 114 and TreeOut 113. The master port logic 117 comprises encoding/decoding circuits, clock logic, line state logic (including idle generation logic), etc. Two multiplexers 210, 220 are provided to direct data within the port interface 110. One multiplexer 210 receives data from the RingIn 111 and the TreeIn 114 (through the master port logic 117), and outputs data to the TreeOut 113 (through the master port logic 117); the other multiplexer 220 receives data from the RingIn 111 and the TreeIn 114 (through the master port logic 117), and outputs data to the RingOut 112.

Typically, a station that "logs into" or enters a ring type network interrupts normal data transmission and causes a recovery process in the network. Referring now to FIG. 3, according to one method, "insertion" of a tree into a ring type network takes place as follows:

A. The multiplexer 220 within a concentrator 100 routes all data from a RingIn 111 to a RingOut 112 (STEP 300).

B. The connection between the tree and a master port of a concentrator 100 is initialized (STEP 310).

C. The multiplexer 210 switches the RingIn 111 to the TreeOut 113 (STEP 320).

D. The multiplexer 220 switches the TreeIn 114 to the RingOut 112 (STEP 330).

As is known, a recovery process typically follows physical connection of the tree to the concentrator 100, as described above. This recovery process takes time and, as a result, consumes network bandwidth and increases queuing delays for information awaiting transmission on the network. A distinguishing characteristic of these networks is that information received from an upstream neighbor is inspected by a particular station and, in some cases, is repeated to a downstream neighbor. Since stations of this type invariably store some information as part of this repeating process, the insertion of a station can corrupt frames that are in transit on the network.

To overcome such problems, a number of techniques, known generally as "graceful insertion," have been proposed which minimize the probability that insertion of a station will cause either a network recovery, or frame corruption, to occur. Referring to FIG. 4, in one graceful insertion system, a concentrator 400 has a second local ring 460 coupling a plurality of port interfaces 410. The port interfaces 410 are coupled to a data transmission system (network ring) and trees, as described above. A local media access controller (MAC) 450 is also coupled to the local ring 460, in known fashion. The concentrator 400 may also have a multiplexer 103 and internal data path 104 that allows a ring to be formed within the concentrator 400.

Referring now to FIG. 5, it can be seen that each port interface 410 includes three multiplexers 510, 520, 560. Two of these multiplexers 510, 520, are substantially the same as the multiplexers 210, 220, described above. The third multiplexer 560 receives data from a data link (LocalIn) 415 to the local ring 460 and a TreeIn 114 (through a master port logic 117), and outputs data on a data link (LocalOut) 416 to the local ring 460. The LocalIn 415 is also coupled to the multiplexer 510. Referring now to FIG. 6, one software controlled graceful insertion technique for inserting a tree into an FDDI ring network functions as follows (the initial state is RingIn 111 to RingOut 112, and LocalIn 415 to LocalOut 416):

A. The connection between the tree and the port interface 117 of the concentrator 400 is initialized (STEP 610). This may include switching of the multiplexer 510 to provide various data patterns to be transmitted to the tree.

B. Multiplexer 510 within the port interface 410 in the concentrator 400 switches LocalIn 415 to TreeOut 113 and the multiplexer 560 switches the TreeIn 114 to LocalOut 416 (STEP 620).

C. A claim process with the Local MAC 450 to is forced make T_Neg within the connecting station's MAC and Ring MAC equal (STEP 630).

D. The local MAC 450 captures the token on the local ring. Capturing the token on the local ring halts data transmission to the local ring 460 (STEP 640).

E. The ring MAC 440 captures the token on the network ring. Capturing this token halts data transmission on the network ring (STEP 650).

F. The ring MAC 440 holds the network token long enough to allow any frames on the network to be delivered to the destination station. This prevents disruption of data transmission (STEP 660).

G. The multiplexer 510 switches the RingIn 111 to the TreeOut 113 (STEP 670).

H. The multiplexer 520 switches the TreeIn 114 to the RingOut 112 (STEP 680).

I. The token is released by the ring MAC 440 on the network ring (STEP 685).

J. The value of T_Neg stored in the ring MAC 440 associated with the network ring is checked to ensure that the value had not changed during insertion (STEP 690).

K. The multiplexer 560 switches the LocalIn 415 to the LocalOut 416 (STEP 695).

In this prior art method, the MAC event interrupts and insertion protocols are executed while the token on the network ring is captured and held by the ring MAC 440 in the concentrator 400. This consumes what would have otherwise been useful network bandwidth. To avoid destroying frames, the token must be held by the ring MAC 440 long enough to allow any frames on the network to be delivered to a destination station. In general, this is less efficient than a normal insertion operation specified in the FDDI standard, referred to above.

Many graceful insertion implementations, such as the one described above, rely on software for time critical operations that are a part of the insertion process. Prior art graceful insertion methods decrease ring bandwidth less than normal insertion only in very large networks. Yet, such prior art graceful insertion systems reduce the number of claim processes and retransmissions of frames damaged during insertion. However, there remains a probability of insertion failure (e.g., holding a token for too long or releasing the token before insertion is complete).

It is therefore an object of the present invention to provide graceful insertion while minimizing the probability of an insertion failure and minimizing bandwidth required. It is a further object of the present invention to provide upgradability of existing concentrators to include such capabilities.

These objects and others are provided in the apparatus and method of the present invention.

SUMMARY OF THE INVENTION

The invention is directed to systems and methods for providing graceful insertion of a tree into a ring type network. According to the invention, an initialized tree is inserted into a network ring at a time when no information, or no useful information, is being carried by the network ring.

According to one aspect of the invention, graceful insertion is achieved by first switching a tree into a local ring of a concentrator and holding the local ring token. After detection of a token on the network ring, the tree is quickly switched from the local ring to the network ring. Switching and monitoring logic placed in the port hardware provides the capability which software graceful insertion or MAC based hardware cannot provide.

In this method, the network ring token is not held by a ring media access controller in a concentrator. Graceful insertion according to the invention is thus seen to increase bandwidth availability of the ring network, since typically no claim process is necessary and the bandwidth (time) required for insertion of the tree and resumption of normal transmission is reduced to zero.

The details of the preferred embodiment of the present invention are set forth in the accompanying drawings and the description below. Once the details of the invention are known, numerous additional innovations and changes will become obvious to one skilled in the art.

DETAILED DESCRIPTION OF THE INVENTION

A graceful insertion system and method according to the preferred embodiment of the invention is described. Throughout this description, the preferred embodiment and examples shown should be considered as exemplars, rather than as limitations on the system and method of the present invention.

Figure 1:
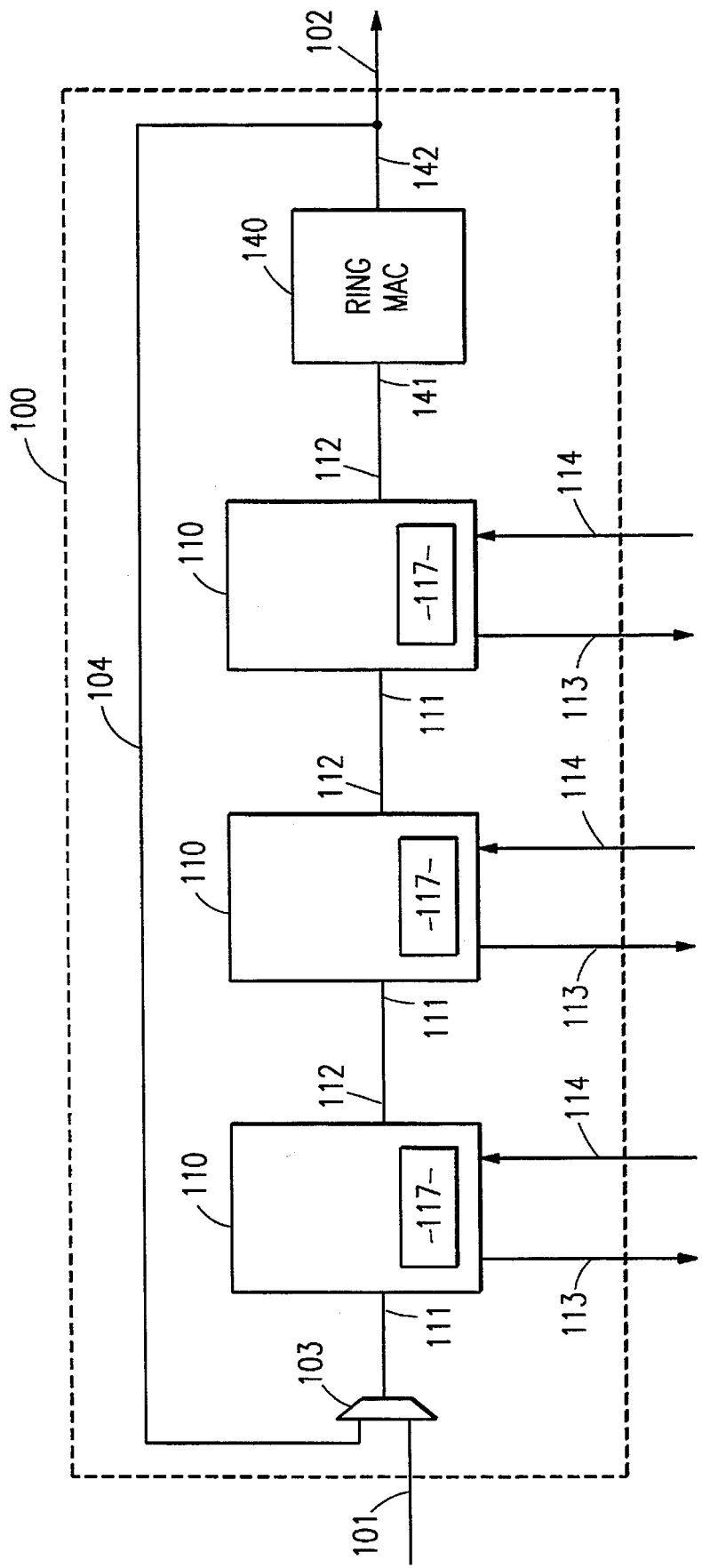
FIG. 1 is a block diagram of a concentrator according to the prior art.
Figure 2:
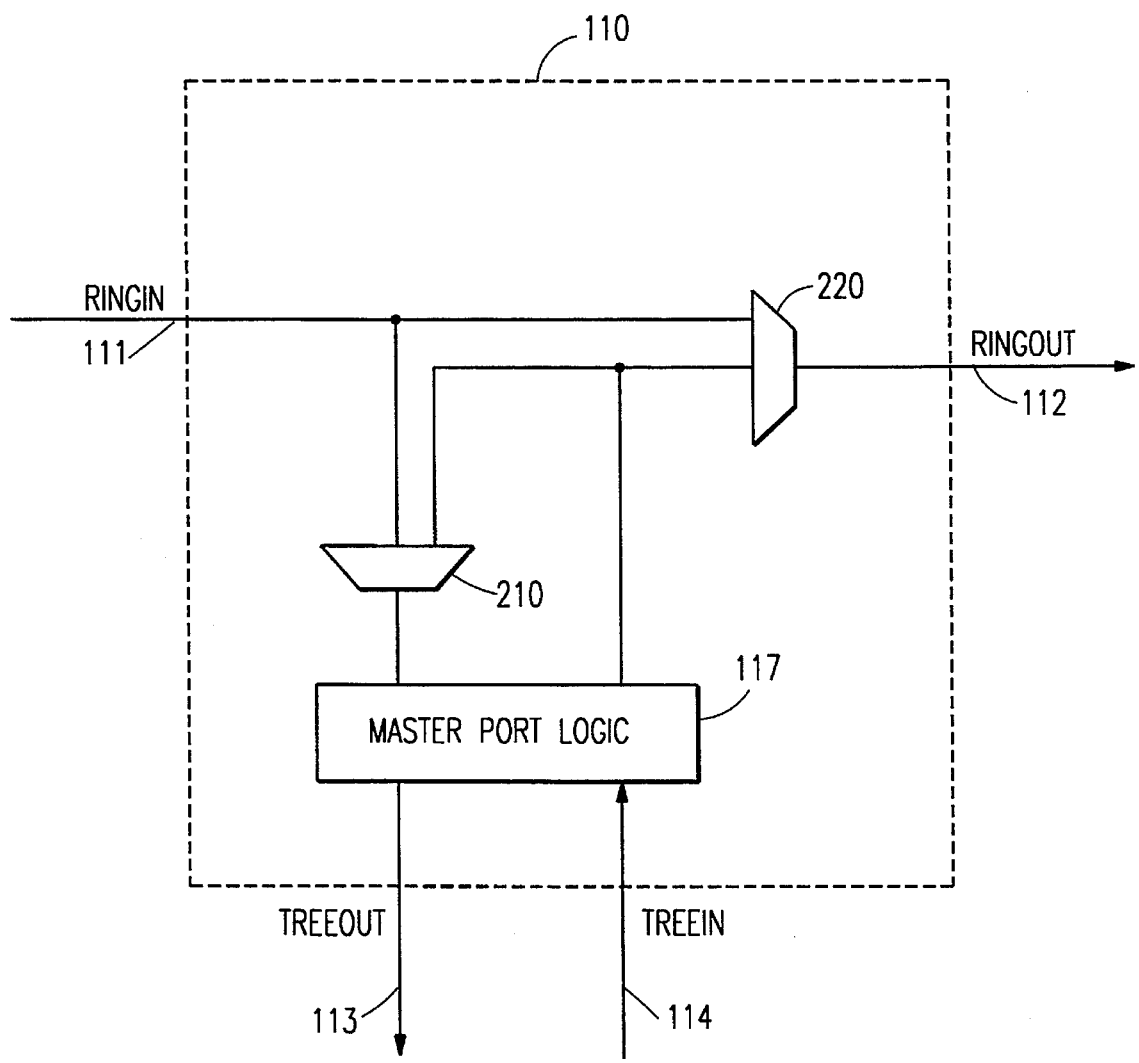
FIG. 2 is a block diagram of a prior art port interface in the concentrator of FIG. 1.
Figure 3:
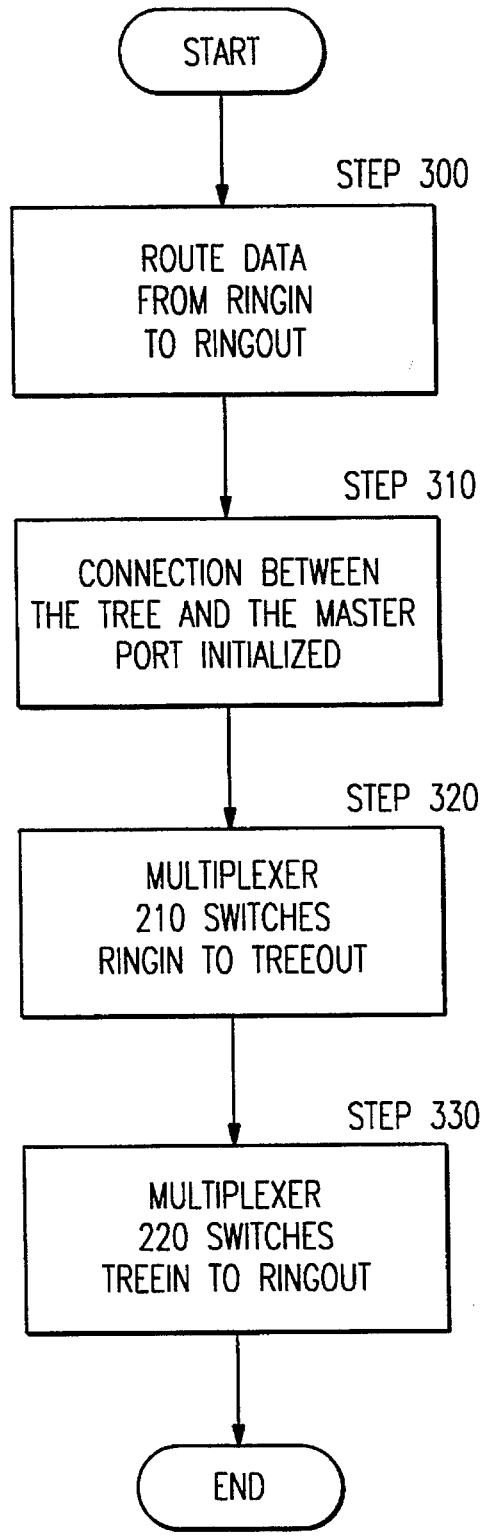
FIG. 3 is a flow chart of the prior art graceful insertion of a tree into the concentrator of FIG. 1.
Figure 4:
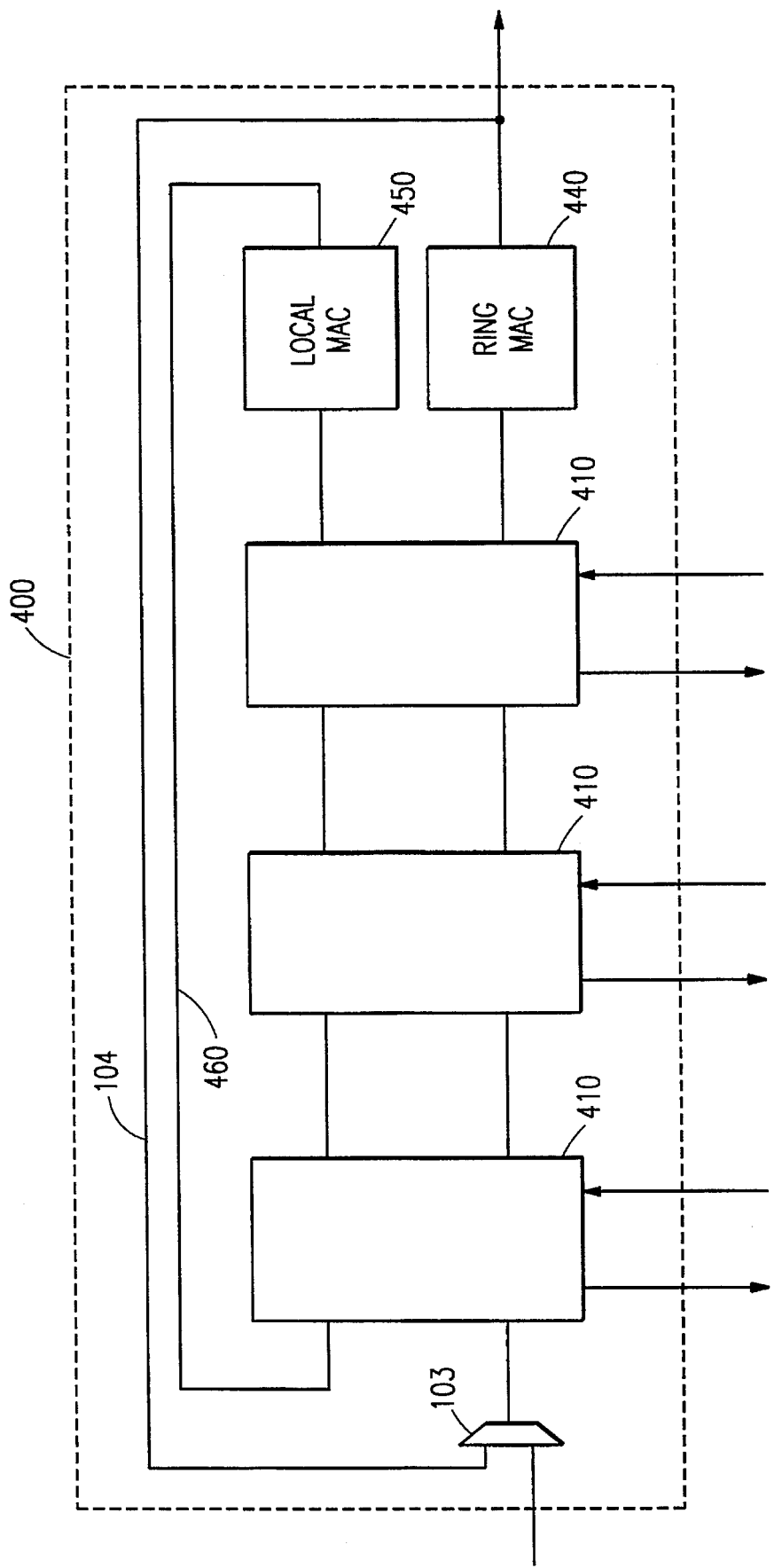
FIG. 4 is a block diagram of a concentrator capable of graceful insertion according to the prior art.
Figure 5:
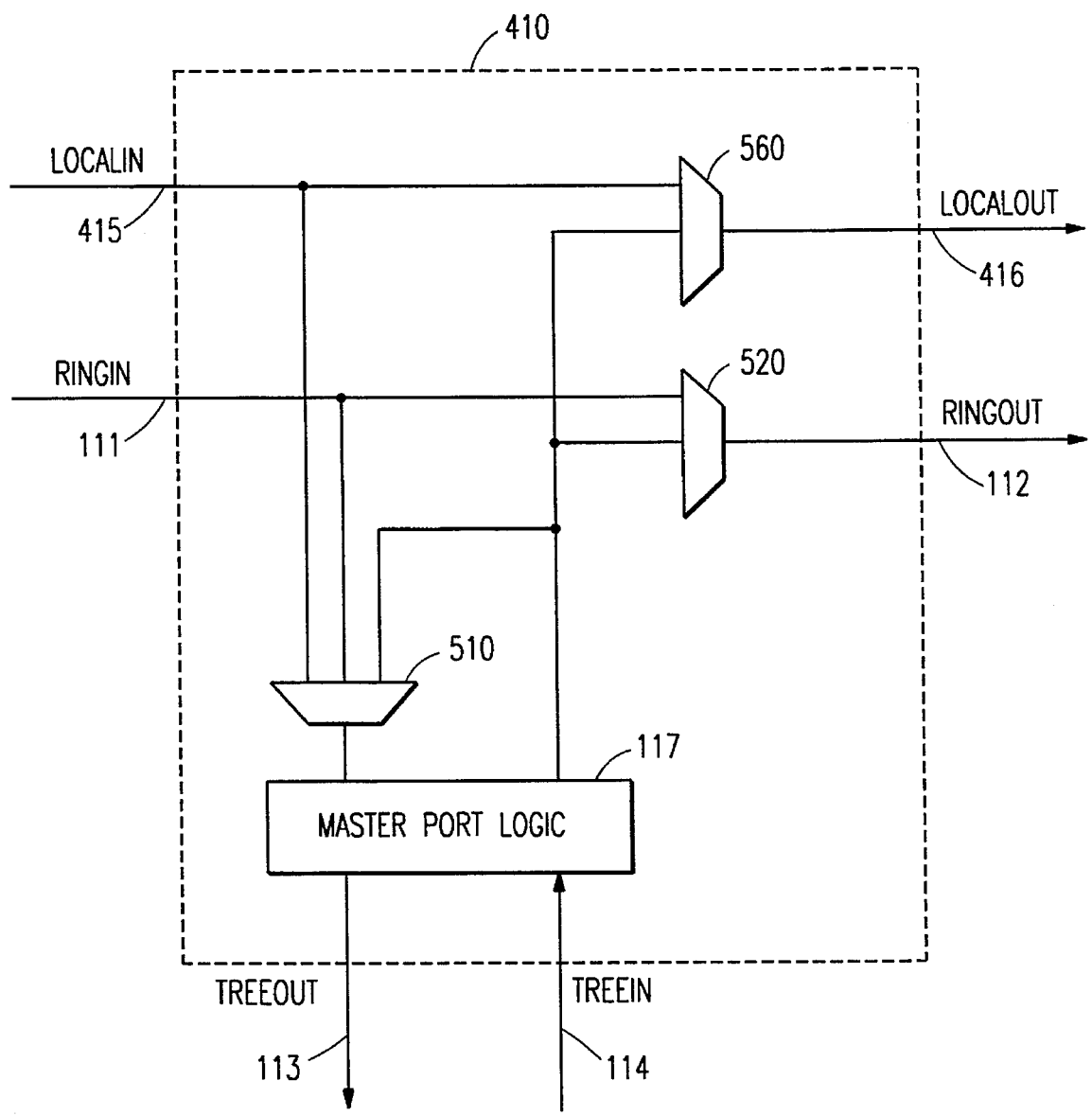
FIG. 5 is a block diagram of a prior art port interface in the concentrator of FIG. 4.
Figure 6:
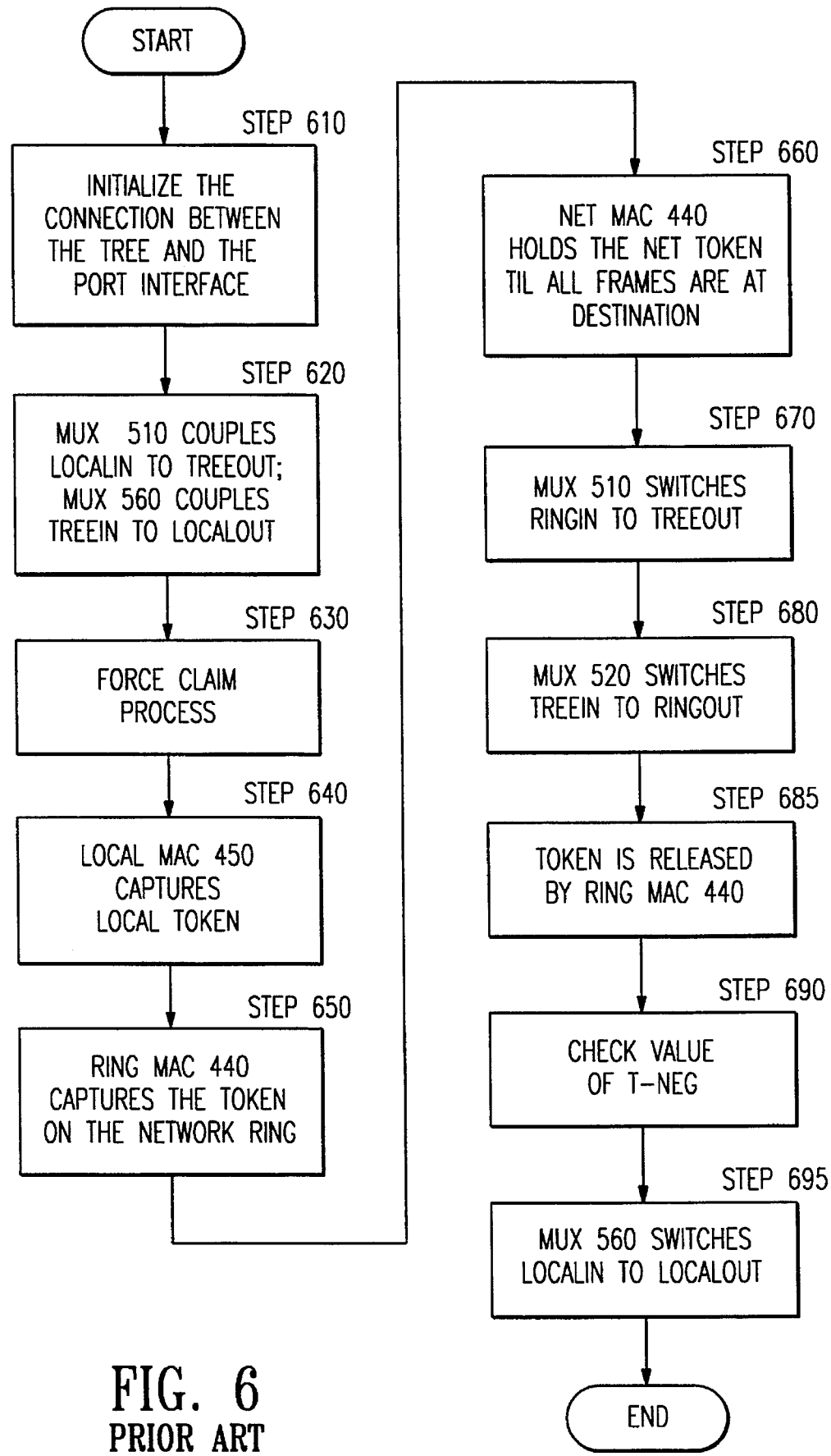
FIG. 6 is a flow chart of the prior art graceful insertion of a tree into the concentrator of FIG. 4.
Figure 7:
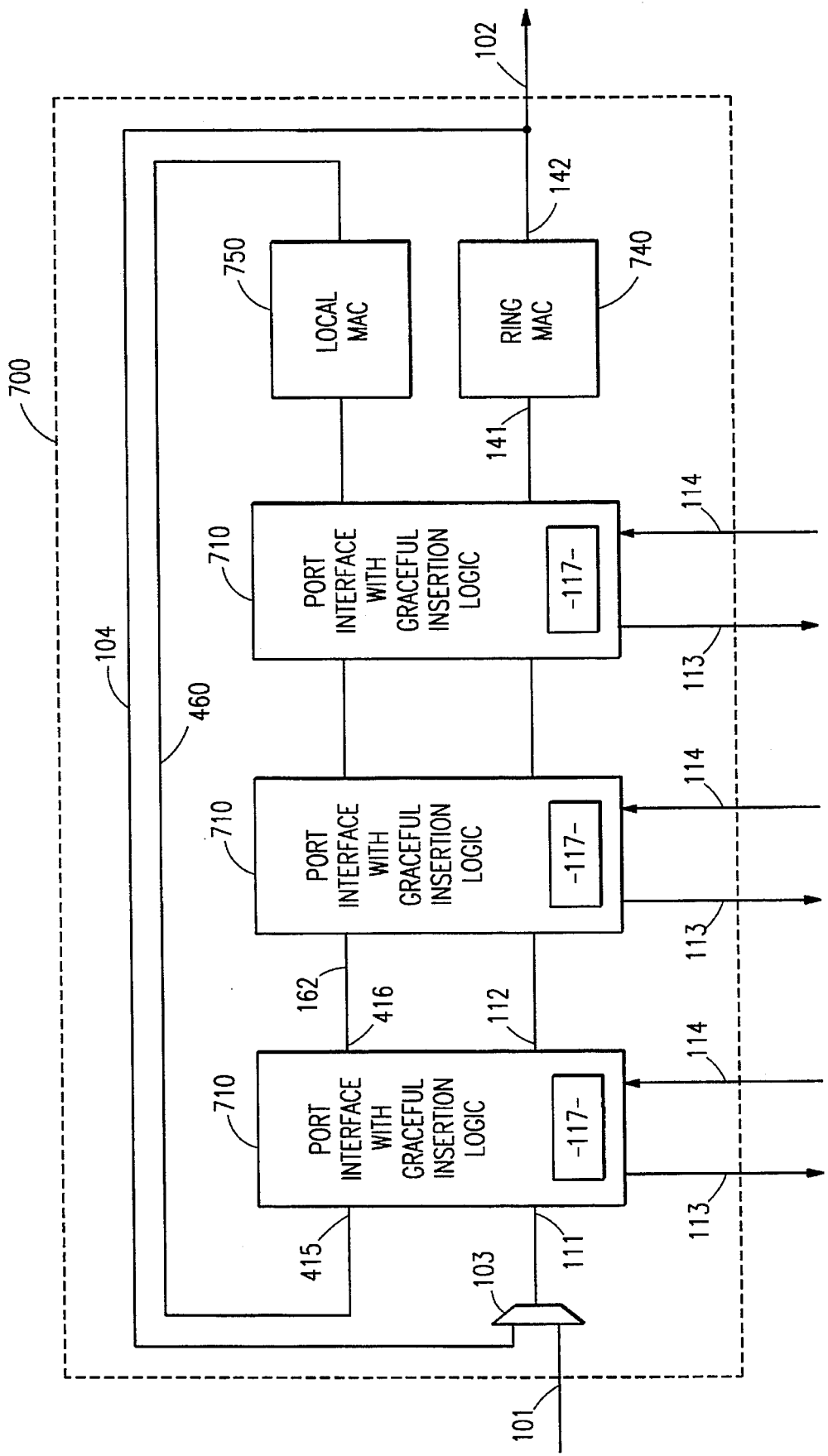
FIG. 7 is a block diagram of a concentrator according to the present invention.

FIG. 7 shows a concentrator 700 for use in a ring type network is shown. The concentrator 700 includes a multiplexer 103, three port interfaces 710, a ring MAC 740, and a local MAC 750.

Each port interface 710 and the local MAC 750 are coupled by links 460, 162 to form a local ring. Each port interface 710 includes a local ring data input link (LocalIn) 415 and a local ring data output link 416 (LocalOut).

The concentrator 700 includes a network ring data input link (RingIn) 101 and a network ring data output link (RingOut) 102 for connecting the concentrator to the network ring. Similarly, each port interface 710 and ring MAC 740 include a RingIn 111, 141 and a RingOut 112, 142. In one embodiment of the present invention, the ring network is coupled to a RingIn 111 of one of the port interfaces 710 through the multiplexer 103. Alternatively, the multiplexer 103 couples the output of the Ring MAC 740 to the RingIn 111 of one port interface 710. Each port interface 710 also includes a master port logic circuit 117, a data input link (TreeIn) 114 and a data output link (TreeOut) 113. The TreeIn 114 and the TreeOut 113 physically connect the associated port interface 710 with corresponding links of a tree. Each port interface 710 is of similar configuration and operation. Therefore, for the sake of brevity and simplicity, the present invention is described with reference to only one such port interface 710. The number of port interfaces 710 is not significant to the present invention.

Figure 8:
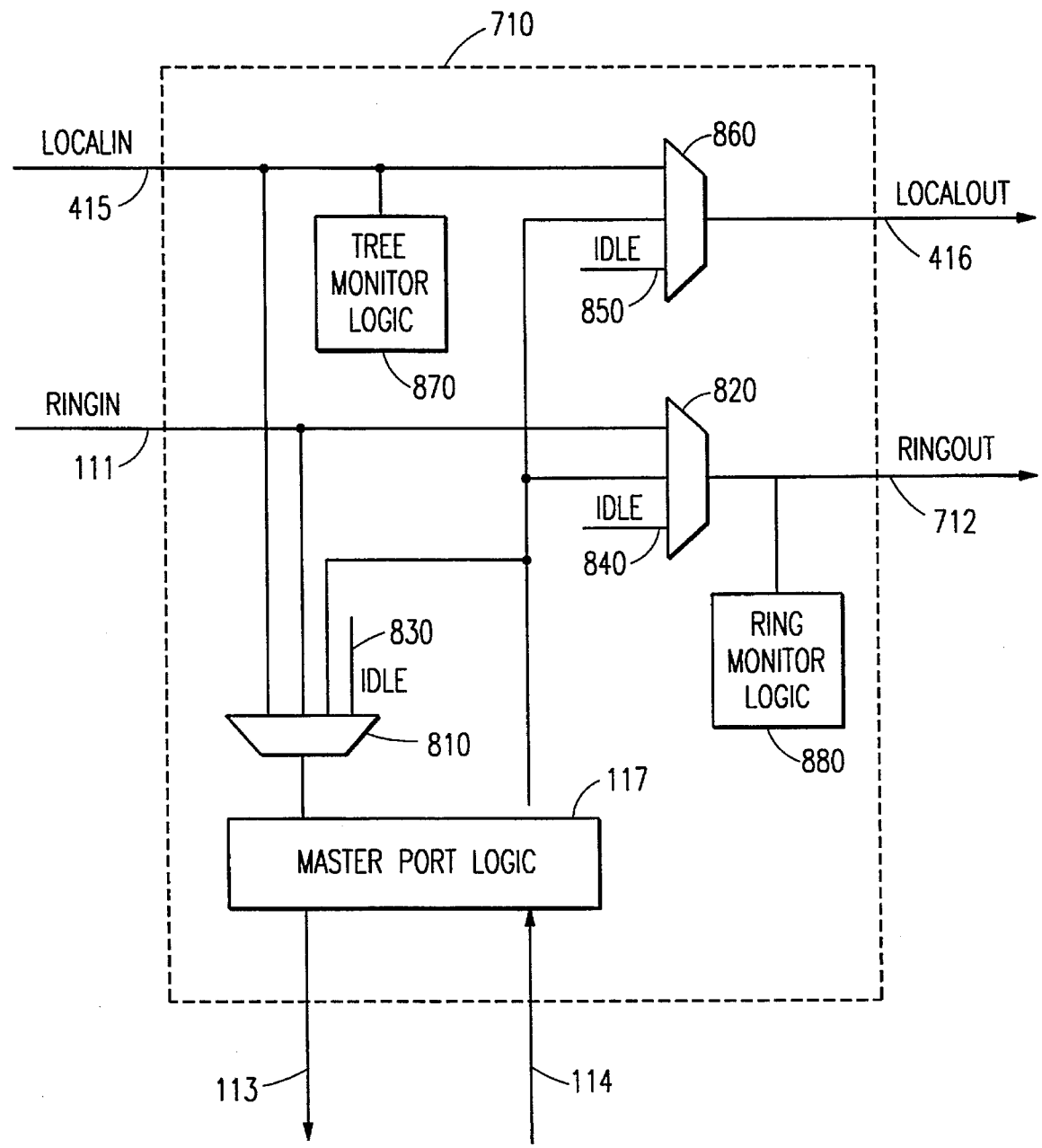
FIG. 8 is a block diagram of a port interface in the concentrator of FIG. 7.

Referring now to FIG. 8, a block diagram of a port interface 710 is shown. The port interface 710 of FIG. 8 includes three multiplexers 810, 820, 860. The first multiplexer 810 receives data from the LocalIn 415, the RingIn 111, the TreeIn 114 (through the master port logic 117), and a line 830 from a source for idle data (in FDDI idle symbols). The multiplexer 810 output data on the TreeOut 113 through the master port logic 117. The multiplexer 820 receives data on the RingIn 111, the TreeIn 114 (through the master port logic 117), and from an idle source 840. The multiplexer 820 outputs data on the RingOut 112. The multiplexer 860 receives data from the LocalIn 415, the TreeIn 114 (through the master port logic 117), and from an idle source 850. The multiplexer 860 outputs data on the LocalOut 416. In an alternative embodiment, the monitor circuits 870, 880 and the multiplexers 810, 820, 860 could be implemented within the master port logic 117 to minimize the logic. For example, the master port logic 117 may include an idle source.

In the preferred embodiment, the port interface 710 further includes tree monitor logic 870 and ring monitor logic 880. The tree monitor logic 870 monitors data transmission on the local ring. The tree monitor logic 870 preferably monitors the local ring from LocalIn 415. The ring monitor logic 880 preferably monitors the network ring at the RingOut 112. The tree monitor logic 870 and the ring monitor logic 880 preferably cooperate to control the switching of the multiplexers 810, 820, 860. The tree monitor logic 870 and ring monitor logic 880 may be implemented in any one of a number of well known ways, so long as the functions described herein are achieved. Accordingly, these functions may be implemented by those of ordinary skill in the art using discrete logic circuit or a sufficiently fast micro-controller or microprocessor circuits.

A method by which a tree may be inserted into the network gracefully in accordance with one embodiment of the present invention will now be described. Before the insertion process begins, the port interface 710 acts as a passthrough.

Thus, LocalIn 415 is coupled through the multiplexer 860 to LocalOut 416, and RingIn 111 is coupled through the multiplexer 820 to RingOut 112.

Figure 9:
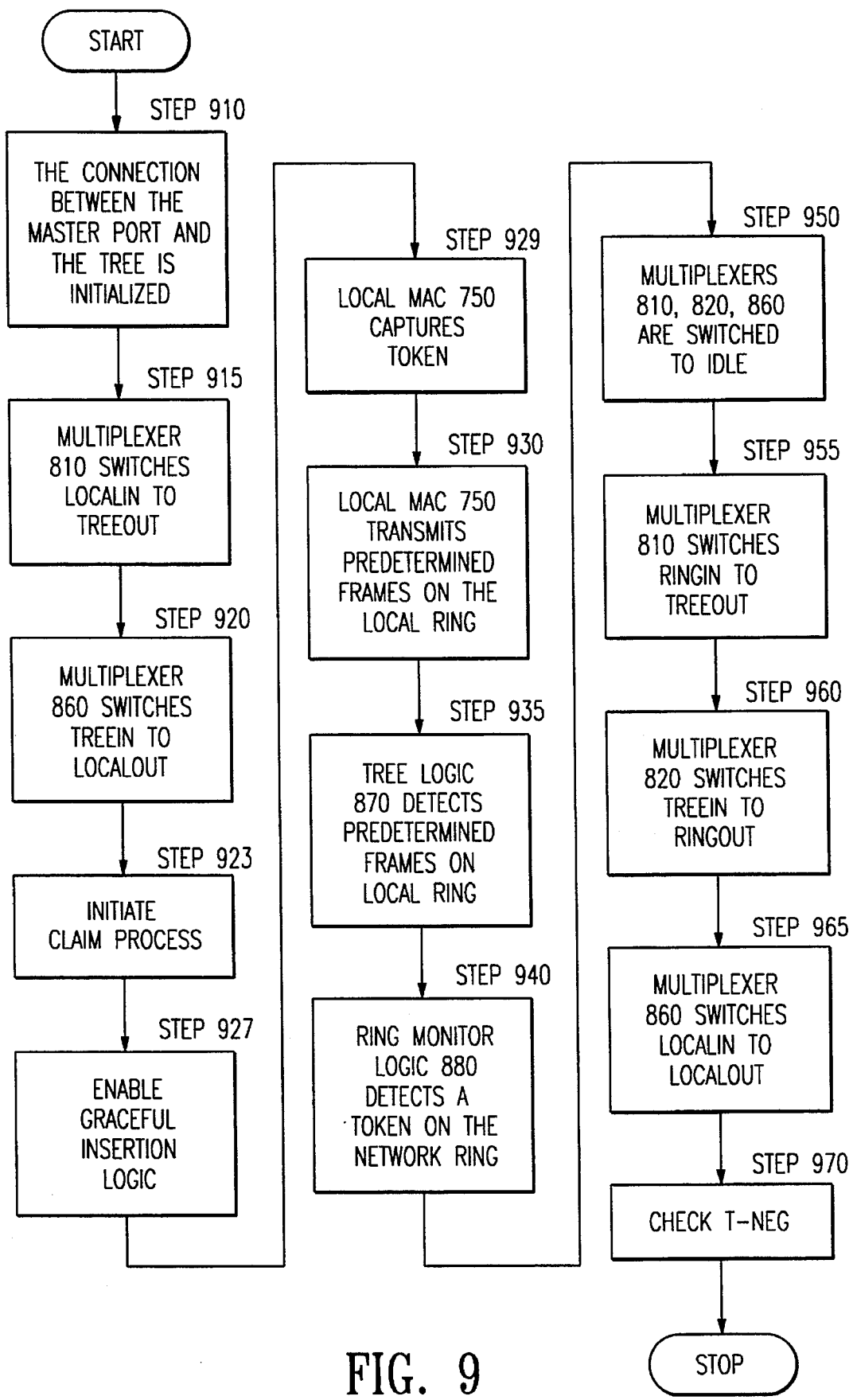
FIG. 9 is a flow chart of the graceful insertion of a tree into the concentrator of FIG. 7 in accordance with the present invention.

Referring now to FIG. 9, in STEP 910, the connection between the master port logic 117 and a tree is initialized. If the network is operating in accordance with the FDDI standard, the Physical Connection Management described in the FDDI standard is run until the CF_Join signal is asserted by a Physical Connection Management state machine, as described in the FDDI standard. At that time, the graceful insertion protocol of the present invention diverges from the protocol specified in the FDDI standards.

In STEP 915, multiplexer 810 switches the LocalIn 415 to the TreeOut 113. In STEP 920, multiplexer 860 switches the TreeIn 114 to the LocalOut 416. Since the tree is inserted into the local ring, which does not carry normal station to station data, this insertion will not disturb station to station data transmission. With the tree now connected to the local ring, the local MAC 750 is used in known fashion to properly initialize the tree before its insertion into the network ring. This initialization is necessary to assure that all of the stations on the tree have the proper value of "T_Neg". This important FDDI parameter, T_Neg, is determined during an initialization process called "claiming". Claiming is defined in the FDDI standard. Accordingly, the local MAC 750 causes a claim process to begin bidding the desired value for T_Neg, as described in the FDDI standard (STEP 923). By performing claiming with the tree in the local ring, the network ring will not be interrupted by the claiming process. Because a ring cannot transmit information unrelated to the claiming process during claiming, inserting a tree into the local ring before insertion into the network ring has a substantial advantage over prior art techniques which insert the tree directly into the ring network, since the network ring will not have to enter a claiming process.

In accordance with the preferred embodiment of the present invention, once the tree is initialized, the local T_Neg is checked to verify that it is equal to the ring T_Neg. If the local T_Neg and the ring T_Neg are not equal, then graceful insertion cannot proceed. Otherwise, insertion of the master port logic 117 into the network ring is preferably performed.

The process of inserting a tree in accordance with the present invention is substantially similar to some prior art methods up to this point. However, the following steps provide a substantial advantage over the prior art.

To achieve insertion in accordance with the present invention, the tree monitor logic 870 must be enabled (STEP 927). Once the tree monitor logic 870 has been enabled, the local MAC 750 captures the token on the local ring (STEP 929). In the preferred embodiment, after the token on the local ring has been captured, to avoid an unwanted recovery process on the tree local, the local MAC 750 transmits frames having a unique, predefined data pattern. When the present invention is implemented essentially in accordance with the FDDI standard, the predefined data pattern is preferably void frames (STEP 930). Detection of the predetermined data pattern by the tree monitor logic is an implicit indication that the token on the local ring has been captured by the local MAC 750.

In an alternative embodiment, a dedicated signal from the local MAC 750 to the tree monitor logic 870 indicates that the token on the local ring has been captured. In such an alternative embodiment, a dedicated circuit could transmit the predefined data patterns to prevent ring recovery. The exact composition of such a circuit is known to those skilled in the art.

In yet another alternative embodiment, the token is captured by the tree monitor logic 870. The tree monitor logic 870 then transmits data, such as void frames, on the local ring to prevent a recovery process from reoccurring on the local ring.

It may be possible in some embodiments of the present invention, to have the local MAC provide an enable signal on a dedicated line indicative of the capture of the token on the local ring. However, even if the tree monitor logic 870 does not receive an enable signal directly from the local MAC 750, the tree monitor logic 870 may infer that the token on the local ring has been captured by detecting one of the predefined frames (void frames in FDDI) preferably sent from the local MAC 750 on the local ring (STEP 935). Since the local MAC 750 preferably transmits predefined frames on the local ring after capturing the token, the tree monitor logic 870 detects these frames as a substitute for, or in addition to, the enable signal. The predefined frames are preferably detected by a dedicated circuit within the tree monitor logic which has been optimized to detect the predefined frames rapidly. The dedicated circuit may, for example, comprise discrete logic including comparitor circuits, as is well known in the art. In the preferred embodiment, the addresses of the predetermined frame are checked to verify that they originated at the local MAC 750.

Preferably, even after the insertion has been enabled, the tree monitor logic 870 continues monitoring the local ring to determine (1) if the local MAC 750 has released the local ring token or (2) if the tree has entered into a recovery process. In the preferred embodiment of the present invention, if either event occurs, circuitry dedicated to detecting such conditions (i.e., detecting a token or a frame indicating the beginning of a recovery process) within the tree monitor logic 870 causes the insertion to be aborted. Insertion can then be reattempted starting from STEP 927.

Once the tree is initialized as explained above, dedicated circuitry, preferably within the network ring monitor logic 880, detects whether a token from RingIn 111 has been transmitted to RingOut 112 through the multiplexer 820 (STEP 940). In a properly functioning token ring, any data that is immediately behind the token has made one complete rotation around the network ring. By determining when to switch the multiplexers with a dedicated circuit at the port interface 710, the tree can be inserted into the network ring without destroying any frames on the network ring. This is a substantial advantage over the prior art methods, which are not capable of determining when to switch the tree into the network ring without destroying a frame of data, since such systems do not have any means for identifying when a token has left a port interface 710.

Even after detection of the token on the network ring, portions of frames may be circulating on the network. To prevent the concatenation of frames during insertion, the ring monitor logic 880 switches all three multiplexers, 810, 820, 860 to idle (STEP 950). In FDDI, for example, idle creates a break between frames, therefore assuring that frames are not concatenated. Thus, the probability of introduction of an undetected error is decreased.

In an alternative embodiment of the present invention, rather than awaiting detection of a token, the ring monitor logic 880 may insert the master port logic 117 into the network ring at another time when no useful information is being carried by the network ring. For example, insertion may proceed upon detection by the ring monitor logic 880 of an end of frame. The tree may then be inserted into the network at an inter-frame gap. However, performing insertion after a token has been detected has several advantages over insertion after receipt of other data patterns. If the network has suffered a catastrophic failure such that no token exists on the network, then inserting a tree may disrupt the fault isolation that may be proceeding on the ring. Furthermore, if the tree being inserted includes multiple stations and the network suffers a catastrophic failure, such that no token exists on the network, these stations cannot continue communications amongst themselves, as is possible with insertion after the token.

In the preferred embodiment, after detecting the token and idling the output links, the tree may be switched into the network ring. The multiplexer 810 switches the RingIn 111 to the TreeOut (STEP 955), the multiplexer 820 switches the TreeIn 114 to the RingOut 112 (STEP 960), and the multiplexer 860 switches the LocalIn to the LocalOut (STEP 965); thereby completing the insertion of the tree into the network ring. The idling of output links 112, 416, 113, and switching into the ring (STEPS 950, 955, 960) must be completed before the unloaded token (i.e., a token which circulates without being utilized by any station on the ring) can return to RingIn 111 of the port interface 710.

Performing the required monitoring and switching in hardware garners faster operation than is generally possible in software. This also assures that insertion of the tree can be completed before the token on the network ring returns to the port interface. Thus, insertion according to this method eliminates the waste of bandwidth on the network ring that occurs in prior art methods which hold the token on the network ring while software makes the change to assure frames are not destroyed.

It is also possible to perform the insertion in front of the token by delaying the network token. Alternatively, insertion may be performed by preventing the network token from being repeated from the RingIn 111 to the RingOut 112, and sending a token to the TreeOut 113 while controlling the multiplexer switches as described above. However, switching behind the token allows for simpler implementation. Also, any insertion method that delays the ring token increases the probability of an unwanted claim process.

Figure 10:
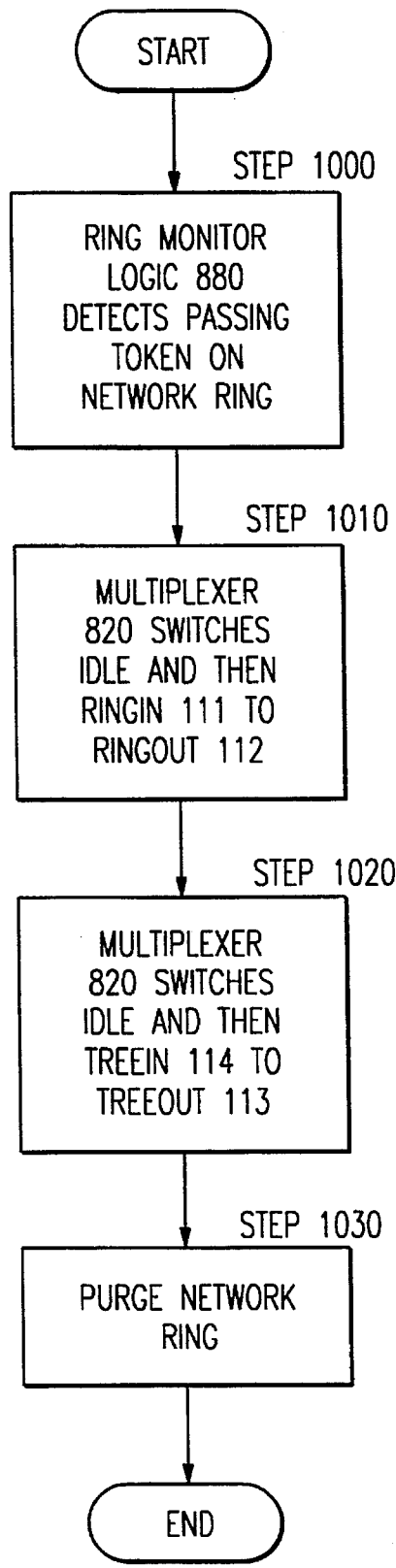
FIG. 10 is a flow chart of the graceful removal of a tree from the concentrator of FIG. 7 in accordance with the present invention.

It is also possible to use the circuitry in FIG. 8 to gracefully remove a tree from the ring. FIG. 10 is a flow chart of the process of removing a tree from a network in accordance with the present invention. A passing token is detected on the network ring with ring monitor logic 880 (STEP 1000). To prevent concatenation of frames the multiplexers 810, 820 are briefly switched to output idle, then multiplexer 820 switches RingIn 111 to RingOut 112 (STEP 1010), and multiplexer 810 switches TreeIn 114 to TreeOut 113 (STEP 1020). To prevent frames transmitted by a station on the tree from continuing to circulate on the ring, the ring must be purged (STEP 1030). This is done in known fashion, as described in the FDDI standards. In the preferred embodiment, the network ring MAC 740 would perform an address independent frame stripping operation known in the art and sometimes referred to as void stripping.

Although exemplary embodiments of the present invention have been shown and described, it will be apparent to those having ordinary skill in the art that a number of changes, modifications, or alterations to the invention as described herein may be made without departing from the scope and spirit of the present invention. Accordingly, it should be understood that the invention is not limited by the specific embodiments illustrated, but only by the scope of the appended claims.

We claim:

1. A concentrator for gracefully inserting a tree into a network ring, the concentrator being configured to receive data frames from the network ring and to transmit data to the network ring such that data frames circulating on the network ring pass through the concentrator, the concentrator comprising:

a. a local ring distinct from the network ring;

b. at least one port interface, each port interface comprising:

(1) a first circuit, coupled to the local ring, for capturing a local token circulating on the local ring and generating an indication of such capture;

(2) a second circuit, coupled to the first circuit and configured to be coupled to the network ring, for detecting a network token circulating on the network ring;

(3) a RingIn port, configured to be coupled to the network ring, for receiving data frames from the network ring, and a RingOut port, configured to be coupled to the network ring, for transmitting data frames to the network ring;

(4) a LocalIn port and a LocalOut port, each coupled to the local ring;

(5) a TreeIn port, configured to be coupled to a tree, for receiving data frames from the tree, and a TreeOut port, configured to be coupled to a tree, for transmitting data frames to the tree;

(6) a first multiplexer having inputs coupled to the RingIn port and the LocalIn Port, and having an output coupled to the TreeOut port;

(7) a second multiplexer having inputs coupled to the RingIn port and the TreeIn port, and having an output coupled to the RingOut Port; and (8) a third multiplexer having inputs coupled to the LocalIn port and the TreeIn port, and having an output coupled to the LocalOut Port;

wherein, for each port interface, the LocalIn port is initially coupled to the TreeOut port by the first multiplexer, the RingIn port is initially coupled to the RingOut port by the second multiplexer, and the TreeIn port is initially coupled to the LocalOut port by the third multiplexer, and wherein the second circuit for each port interface, upon receipt from the first circuit of an indication that the local token has been captured and upon detecting that a network token has passed through and exited such port interface through the network ring, causes the first multiplexer to couple the RingIn port to the TreeOut port, the second multiplexer to couple the TreeIn port to the RingOut Port, and the third multiplexer to couple the LocalIn port to the LocalOut port, thereby gracefully inserting the tree into the network ring.

2. A method of gracefully inserting a tree into a network ring using a concentrator, the concentrator including (1) a RingIn port and RingOut port each configured to be coupled to the network ring, (2) a local ring distinct from the network ring and having a LocalIn Port and a LocalOut port, and (3) a TreeIn port and TreeOut port each configured to be coupled to the tree, the method comprising the steps of:

a. coupling the RingIn port and the RingOut port to the network ring external from the concentrator;

b. coupling the RingIn port to the RingOut port within the concentrator to effect a pass through condition such that a network token may circulate on the network ring, and coupling the LocalIn port to the LocalOut port within the concentrator to effect a pass through condition such that a local token may circulate on the local ring;

c. coupling a tree having an input and an output to the TreeOut port and TreeIn port, respectively, of the concentrator;

d. initially coupling the LocalIn port to the TreeOut port and the TreeIn port to the LocalOut port;

e. capturing the local token circulating on the local ring;

f. detecting the network token circulating on the network ring passing through and exiting the concentrator; and g. coupling the RingIn port to the TreeOut port and the TreeIn port to the RingOut port upon capture of the local token and detection of the network token, thereby gracefully inserting the tree into the ring network.

3. A method of gracefully inserting a tree into a network ring using a concentrator, the concentrator including (1) a RingIn port and RingOut port each configured to be coupled to the network ring, (2) a local ring distinct from the network ring and having a LocalIn Port and a LocalOut port, and (3) a TreeIn port and TreeOut port each configured to be coupled to the tree, the method comprising the steps of:

a. coupling the Ringin port and the RingOut port to the network ring external from the concentrator;

b. coupling the RingIn port to the RingOut port within the concentrator to effect a pass through condition such that a network token may circulate on the network ring, and coupling the LocalIn port to the LocalOut port within the concentrator to effect a pass through condition such that a local token may circulate on the local ring;

c. coupling a tree having an input and an output to the TreeOut port and TreeIn port, respectively, of the concentrator;

d. coupling the LocalIn port to the TreeOut port and the TreeIn port to the LocalOut port;

e. capturing the local token circulating on the local ring;

f. communicating the capture of the local token to at least a first circuit;

g. detecting the network token circulating on the network ring passing through and exiting the concentrator;

h. communicating the detection of the network token to at least the first circuit; and i. coupling the RingIn port to the TreeOut port and the TreeIn port to the RingOut port upon capture of the local token and detection of the network token, under the control of the first circuit, thereby gracefully inserting the tree into the ring network.

4. The method of claims 2 or 3, for removing the tree from the network ring by the further steps of:

a. detecting a network token on the network ring;

b. switching the RingIn port to the RingOut port in response to the detection of the network token on the network ring;

c. switching the TreeIn port to the TreeOut port in response to the detection of the network token on the network ring.

5. The method of claim 4, further including the further steps of:

a. switching an idle source to the RingOut port before switching the RingIn port to the RingOut port;

b. switching an idle source to the TreeOut port before switching the TreeIn port to the TreeOut port.

* * * * *